(12) United States Patent
de Groote et al.

(10) Patent No.: US 7,806,354 B2
(45) Date of Patent: Oct. 5, 2010

(54) CONDIMENT MILL

(75) Inventors: Jan-Hendrik de Groote, Haaltert (BE); Ine Vandaele, Moorsele (BE)

(73) Assignee: Dart Industries Inc., Orlando, FL (US)

( * ) Notice: Subject to any disclaimer, the term of this patent is extended or adjusted under 35 U.S.C. 154(b) by 65 days.

(21) Appl. No.: 11/892,520

(22) Filed: Aug. 23, 2007

(65) Prior Publication Data

US 2009/0050722 A1   Feb. 26, 2009

(51) Int. Cl.
*A47J 42/04* (2006.01)
(52) U.S. Cl. ................................... 241/169.1
(58) Field of Classification Search .............. 241/169.1, 241/169, 261.1
See application file for complete search history.

(56) References Cited

U.S. PATENT DOCUMENTS

| | | | |
|---|---|---|---|
| 3,136,491 A * | 6/1964 | Posmanter | ............... 241/169.1 |
| 3,371,874 A | 3/1968 | Reeves et al. | |
| 3,991,947 A | 11/1976 | Schlessel | |
| 4,026,490 A | 5/1977 | Johansson | |
| 4,135,672 A | 1/1979 | Schlessel | |
| 4,139,161 A | 2/1979 | Hupperich | |
| D284,252 S | 6/1986 | Lichtenvort | |
| 4,960,246 A | 10/1990 | Fohrman | |
| D352,640 S | 11/1994 | Kibbe | |
| 6,196,481 B1 | 3/2001 | Barbagli | |
| 6,247,661 B1 | 6/2001 | Chainani | |
| D446,692 S | 8/2001 | Bodum | |
| D455,324 S | 4/2002 | Wright | |
| 6,443,377 B1 | 9/2002 | Cheng | |
| 6,655,616 B1 | 12/2003 | Wagner | |
| 6,663,031 B2 | 12/2003 | Henderson et al. | |
| D486,702 S | 2/2004 | Sorensen | |
| 6,929,201 B1 | 8/2005 | Blouse et al. | |
| 2002/0092941 A1 | 7/2002 | Henderson et al. | |
| 2002/0117566 A1* | 8/2002 | Cheng | ..................... 241/169.1 |
| 2006/0006262 A1* | 1/2006 | Gilberts | ..................... 241/169.1 |
| 2006/0076369 A1* | 4/2006 | McGuyer | ..................... 222/434 |
| 2006/0278746 A1 | 12/2006 | Delbridge et al. | |

FOREIGN PATENT DOCUMENTS

| DE | 29918543 | * | 3/2000 |
|---|---|---|---|
| DE | 202 14 170 | | 3/2003 |
| FR | 2 871 674 | | 12/2005 |
| WO | WO 2004/037057 | | 5/2004 |

* cited by examiner

*Primary Examiner*—Mark Rosenbaum

(57) ABSTRACT

A condiment mill is disclosed having a first sleeve, a second sleeve rotatably attached to the second sleeve, a grinding apparatus operably disposed within the first sleeve and the second sleeve, a sliding cap slidably mounted over the first sleeve and the second sleeve, a cap disposed on the grinding apparatus, and wherein the sliding cap is slidable between a first position to rotate the grinding apparatus for grinding condiments and a second position secured against the cap to provide a seal for the condiment mill.

11 Claims, 5 Drawing Sheets

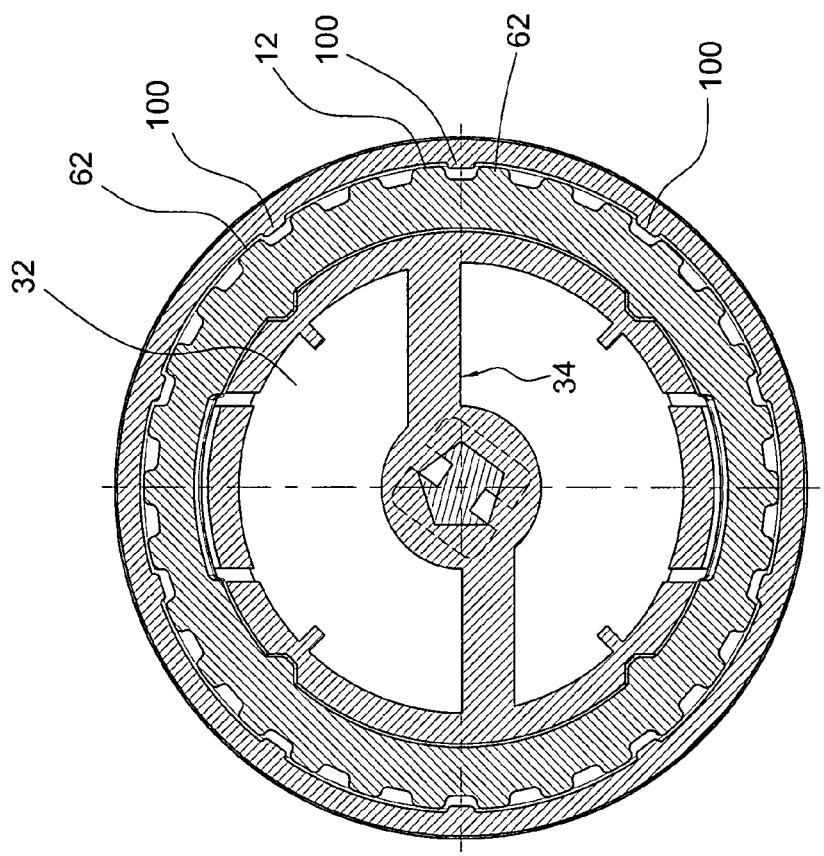
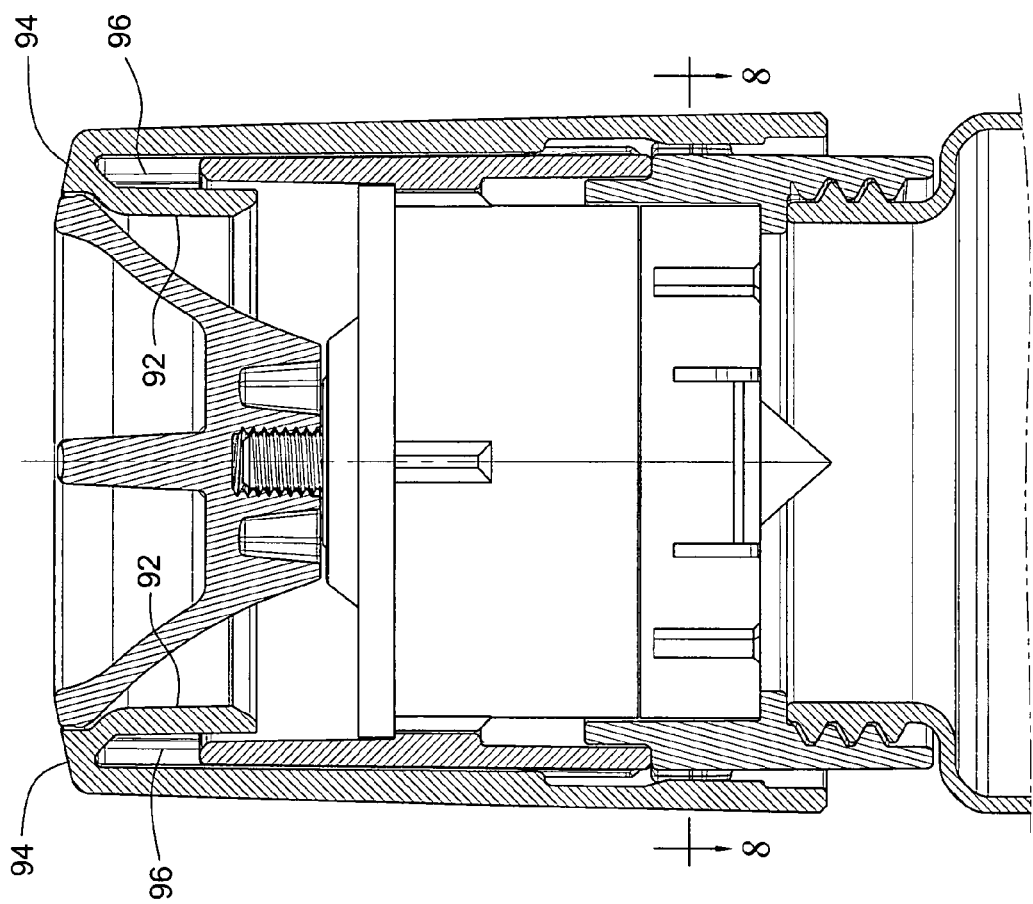
FIG. 8
FIG. 7

US 7,806,354 B2

CONDIMENT MILL

TECHNICAL FIELD

The present invention is directed toward a condiment or spice mill, and more particularly, toward a condiment mill having a slidable cap.

BACKGROUND OF THE INVENTION

Prior art spice mills have been commonly used for grinding and dispensing spices immediately before use. Commonly, such table spice grinders or mills include a grinding mechanism disposed on the bottom of the spice container or jar and placed on the table upside down.

However, one of the shortcomings of the prior art spice mills is that the grinding mechanism functions as the base of the spice mill and container combination resulting in ground spice particles to be left on the table after use. Moreover, because spices and certain condiments tend to lose much of their freshness if not kept in a sealed container, a separate lid or cap is required to be placed on top of the spice mill to seal the contents of the container.

It is therefore a primary object of the present invention to provide a condiment mill which includes a slidable cap to function as a seal when the condiment mill is not used.

It is a further objection of the present invention to provide a condiment mill having a grinding mechanism that can be secured on top of the container in an upright manner.

SUMMARY OF THE INVENTION

These problems and others are addressed by the present invention which comprises a condiment mill having a first sleeve a second sleeve rotatably attached to the second sleeve, a grinding apparatus operably disposed within the first sleeve and the second sleeve, a sliding cap slidably mounted over the first sleeve and the second sleeve, a cap disposed on the grinding apparatus, and wherein the sliding cap is slidable between a first position to rotate the grinding apparatus for grinding condiments and a second position secured against the cap to provide a seal for the condiment mill.

BRIEF DESCRIPTION OF DRAWINGS

These and other objects of the present invention will be appreciated and understood by those skilled in the art from the detailed description of the preferred embodiments of the invention and the following drawings of which:

FIG. 7 is a cross-sectional of the condiment mill in a closed position; and,

FIG. 8 is a cross-sectional view of the condiment mill taken along line 8-8 of FIG. 7.

DETAILED DESCRIPTION OF THE INVENTION

Figures 1, 2:
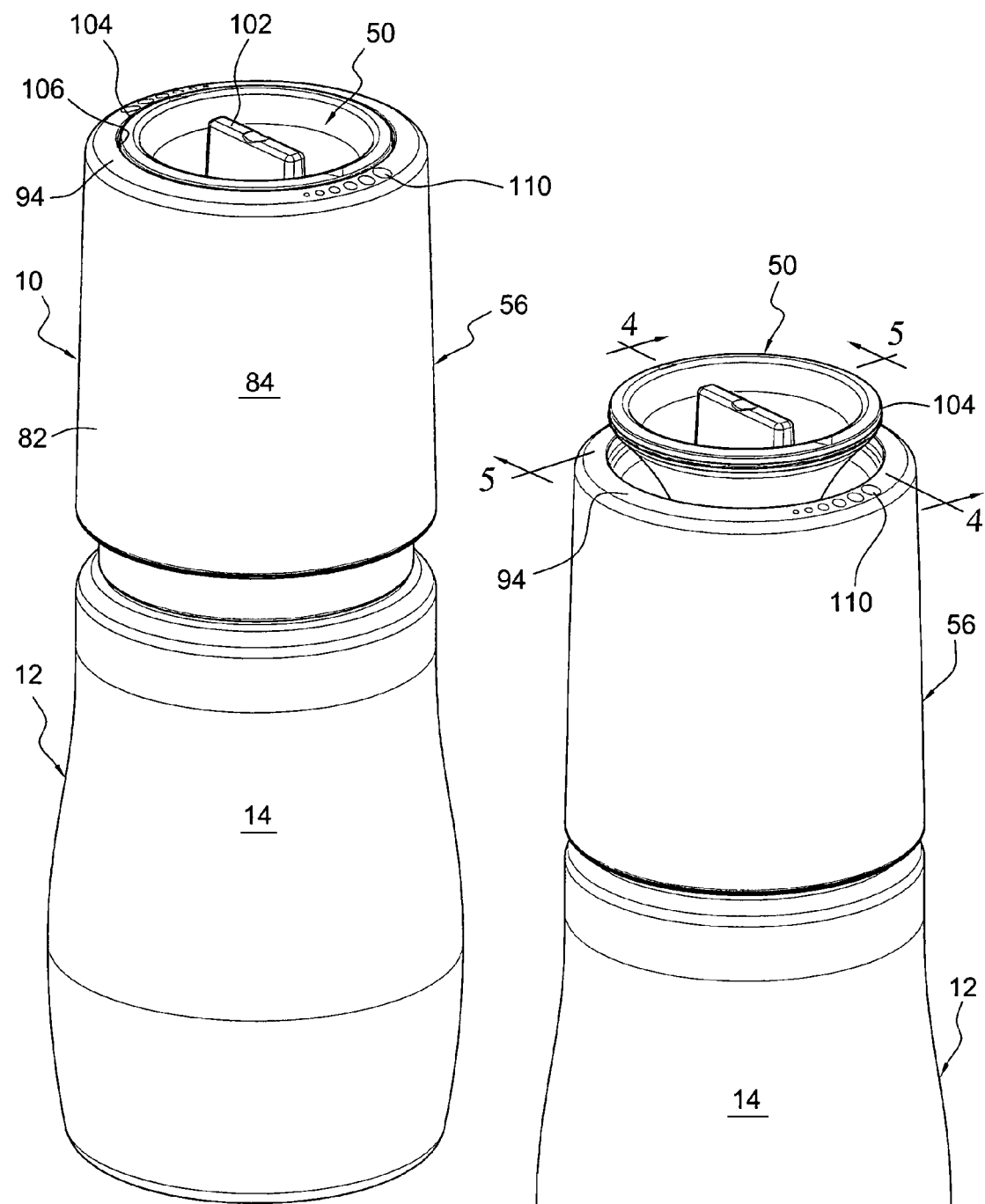
FIG. 1 is a perspective view of the condiment mill and container assembly in a non-use closed position according the present invention.
FIG. 2 is a perspective view of the condiment mill and container assembly in an opened position according to FIG. 1.
Figure 3:
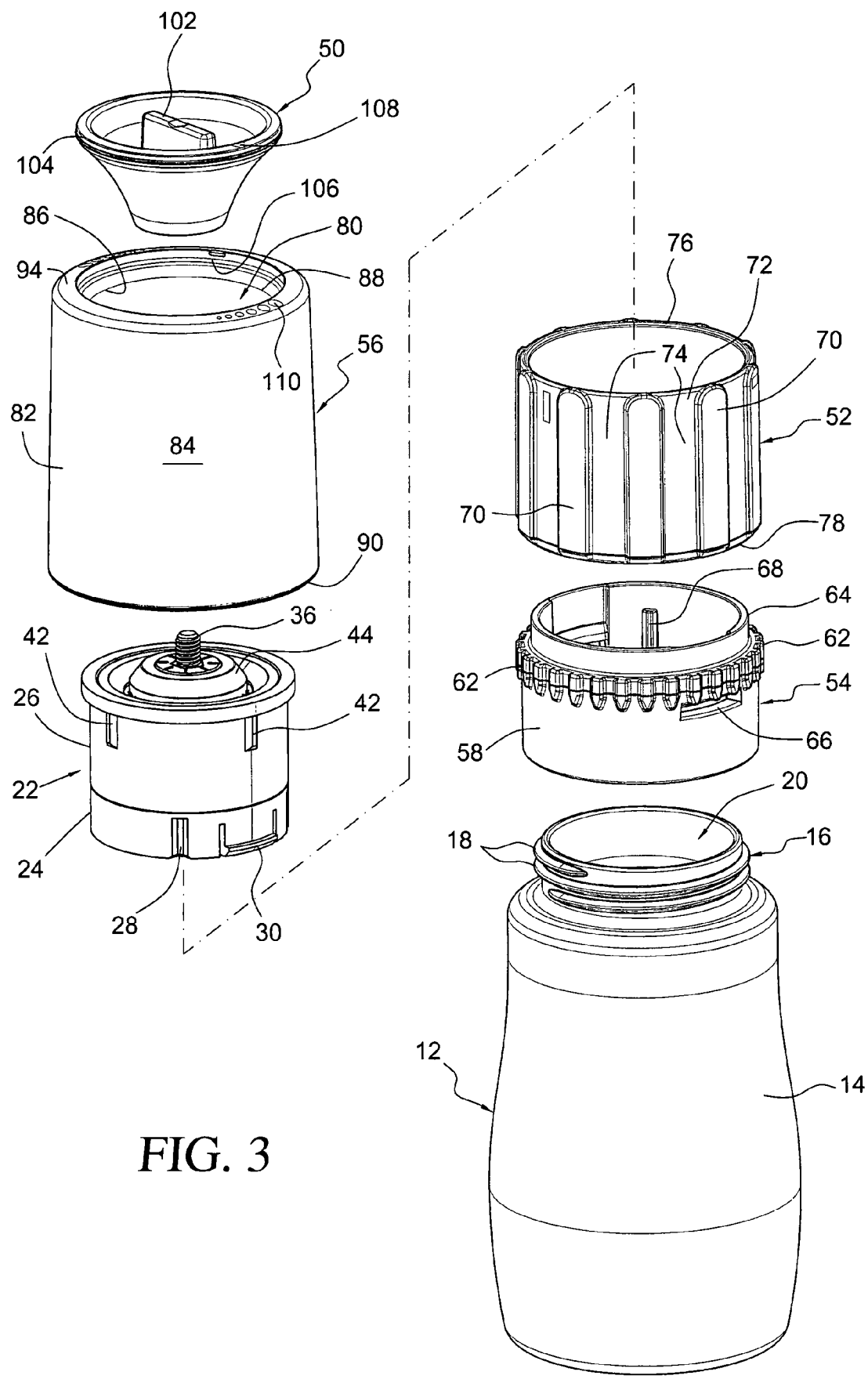
FIG. 3 is an exploded view of the condiment mill and container assembly of FIG. 1.
Figure 4:
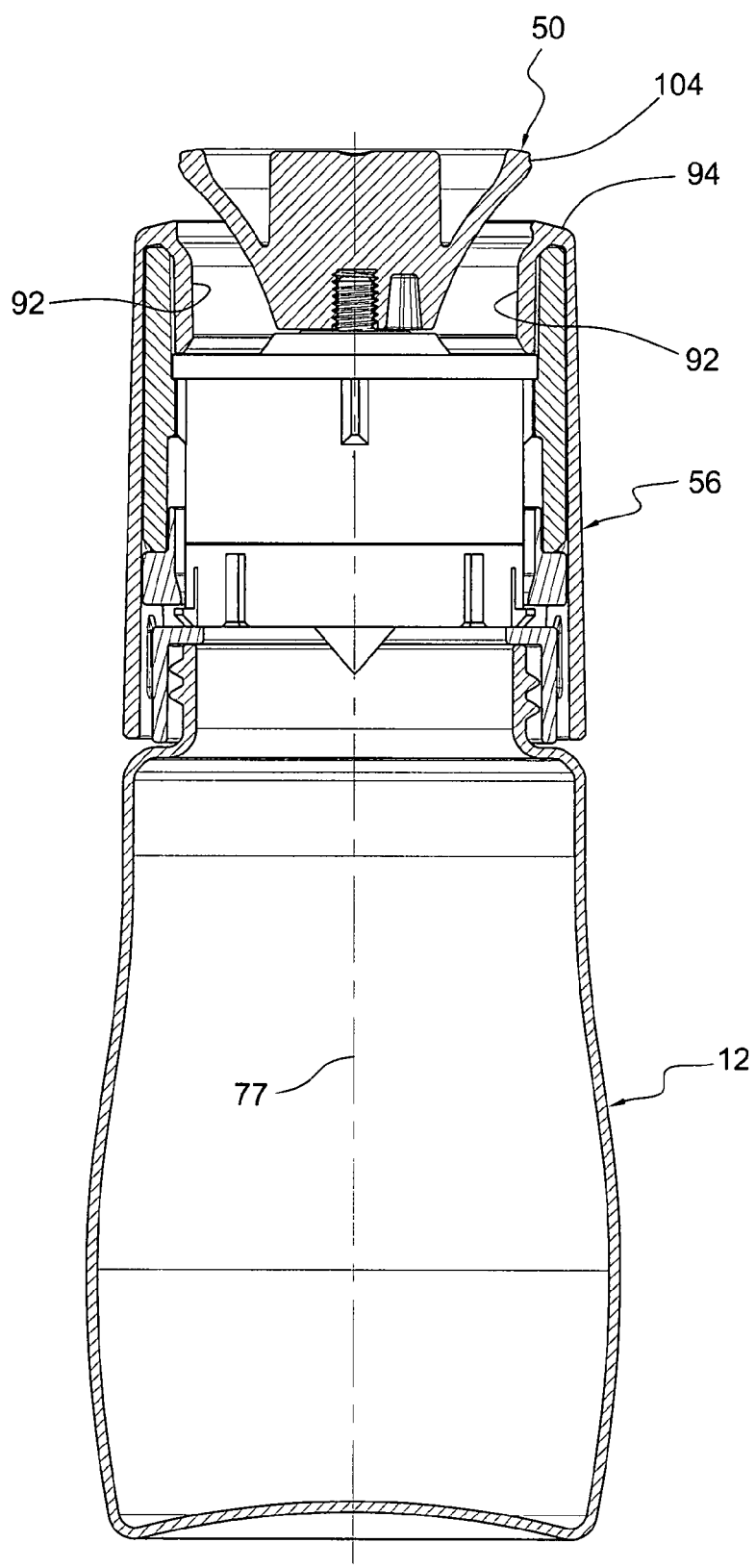
FIG. 4 is a cross-sectional view of the condiment mill and container assembly taken along line 4-4 of FIG. 2.

Referring now to the drawings, and more specifically FIGS. 1-3, wherein the showings are for the purpose of illustrating the preferred embodiment of the invention only and not for the purpose of limiting the same, a condiment mill apparatus is generally shown at 10 in combination with a spice or condiment jar 12 having a substantially cylindrical shape and configuration. The condiment jar 12 includes an outer wall 14 having an upper threaded mouth 16 of a smaller diameter than that of the outer wall 14 with a plurality of threads 18 and bounding an opening 20 at the top for providing access inside the condiment jar 12. As will be explained in greater detail herein, the condiment jar 12 is stored on a support surface in an upright manner and the condiment mill 10 is threadably and removably secured on the upper threaded mouth 16.

The condiment mill 10 comprises a grinding apparatus 22 of a substantially cylindrical shape and configuration having a lower portion 24 rotatably attached to an upper portion 26. The lower portion 24 includes a plurality of longitudinal indentations 28 evenly spaced on an outer surface thereof, and a pair of opposing resilient tongue members 30 at a lower peripheral portion thereof. The lower portion 24 also includes a throughbore 32 and a laterally extending dispensing bar 34 supporting an upright threaded post 36 in a middle portion thereof.

The upper portion 26 also includes a throughbore 38 having a plurality of grinding teeth 40 on an inner surface thereof, and a plurality of notches 42 evenly spaced on an outer surface thereof. A portion of the threaded post 36 includes a pentagonal or square cross-section for receiving a grinding wheel 44 and for preventing the grinding wheel 44 from freely rotating about the threaded post 36. The grinding wheel 44 also includes a plurality of grinding teeth 46 in a facing relation with the grinding teeth 40 of the upper portion 26 when the grinding wheel 44 is placed on the threaded post 36. A helical spring 48 is supported on the threaded post 36 and provides a spring biased force in an upward direction against the grinding wheel 44, and as will be explained in greater detail herein, the biased force is countered by a frusto-conically shaped cap 50 screwed onto the threaded portion of the threaded post 36, and the rotation of which adjusts the height of the grinding wheel 44 and, therefore, the distance between grinding teeth 46 of the grinding wheel 44 and the grinding teeth 40 of the upper portion 26 in order to adjust the ground particles.

Referring now to FIGS. 3-6, the condiment mill 10 further comprises a first sleeve 52, a second sleeve 54, and a sliding cap 56. The second sleeve 54 has a substantially cylindrical shape and configuration having an outer wall 58 and a threaded inner lower portion 60 having a plurality of teeth for threadably engaging the upper threaded mouth 16 and securing the condiment mill 10 on the condiment jar 12. The second sleeve 54 also includes a peripheral ring portion 64 on an upper portion thereof and having a diameter smaller than that of the second sleeve 54.

A first plurality of longitudinal protrusions 62 are disposed on the outer wall 58 closer to the upper peripheral edge thereof. A pair of opposing tongue-receiving apertures 66 is disposed on the outer wall 58, which, as will be explained, each is dimensioned and configured to receive the corresponding tongue member 30 of the lower portion 24 of the grinding apparatus 20 for securing the lower portion 24 within second sleeve 54. A plurality of protrusions 68 on the inner surface of the second sleeve 54 is dimensioned and configured to mate with the corresponding indentations 28 of the lower portion 24 when securing the grinding apparatus 22 within the second sleeve 54.

The first sleeve 52 comprises a plurality of elongate and substantially rectangular-shaped protrusions on an outer wall surface 72 thereof creating an alternating configuration of peaks and valleys 74 extending from an upper peripheral edge 76 of the first sleeve 52 to a lower peripheral edge 78 thereof. The lower opening of the first sleeve 52 is dimensioned to have the peripheral ring portion 64 of the second sleeve 54 received therewithin to the extent that the lower peripheral edge 78 rests on the ledge of the outer wall 58 allowing the first sleeve 52 and second sleeve 54 to rotate relative with one another about a common vertical axis 77.

The grinding apparatus 22, the first sleeve 52, and the second sleeve 54 are assembled together in the following manner. The lower portion 24 of the grinding apparatus 22 is inserted within the second sleeve 54 from the top so that each indentation 28 is received by the corresponding protrusion 68, and each tongue member 30 snaps within the corresponding tongue-receiving aperture 66, thereby securing the lower portion 24 to the second sleeve 54 and preventing the lower portion 24 to independently rotate on its own.

The first sleeve 52 is then placed over the upper portion 26 of the grinding apparatus 22 wherein each notch 42 is received by the corresponding aperture, thereby securing the upper portion 26 to the first sleeve 52, and wherein the rotation of the first sleeve 52 relative to the second sleeve 54 results in the rotation of the upper portion 26 relative to the lower portion 24 of the grinding apparatus 22 for grinding the condiment contents of the condiment jar 12.

Figure 5:
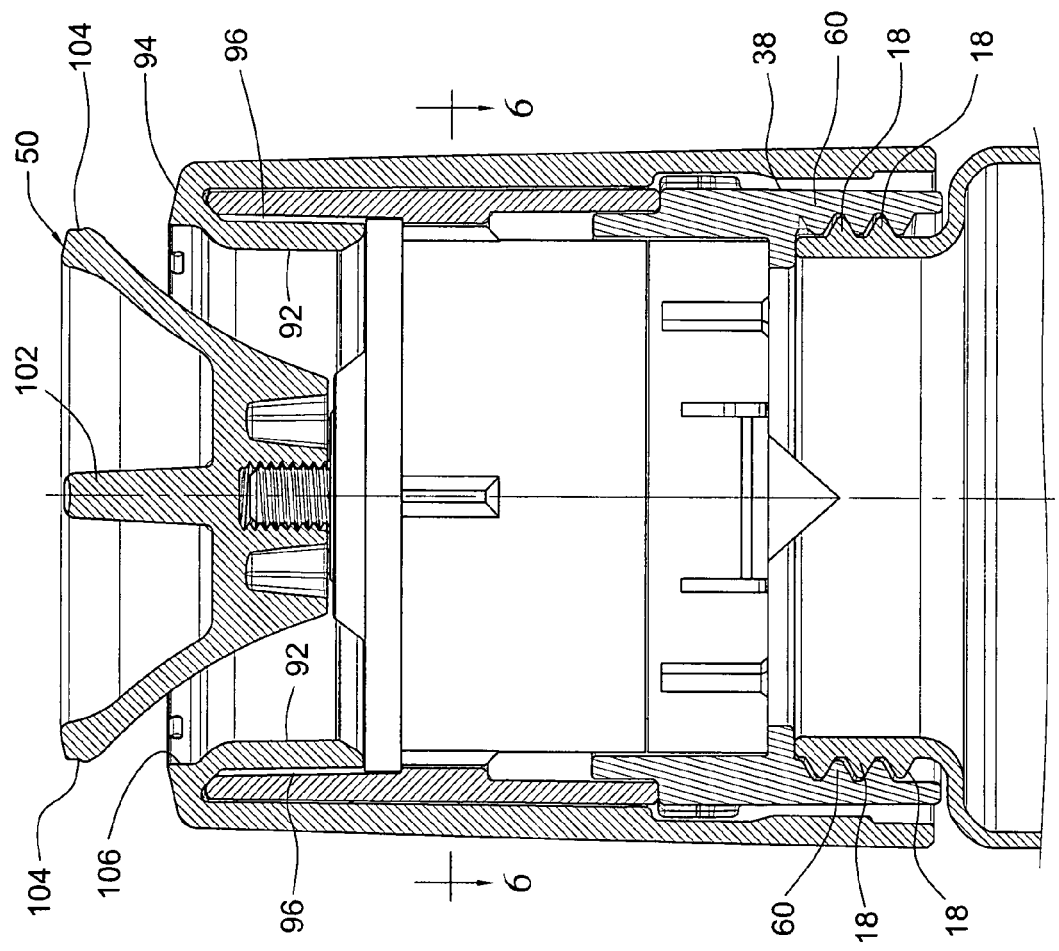
FIG. 5 is a cross-sectional view of the condiment mill taken along line 5-5 of FIG. 2.

Referring now to FIGS. 2, 5, and 7, the details and operation of the sliding cap 56 is further explained. The sliding cap 56 has a substantially cylindrical shape and configuration dimensioned and configured to slide up and down over the first sleeve 52 and the second sleeve 54. The sliding cap 56 includes a throughbore 80, a wall portion 82 having an outer surface 84, an inner surface 86, and bounding a top opening 88 and a bottom opening 90. An inner wall 92 extends downwardly from the upper periphery 94 of the sliding cap 56 creating an annular space 96 between the inner surface of the inner wall 92 and the inner surface of the outer wall portion 82, which, gas will be explained in greater detail herein, receives a portion of the outer wall of the first sleeve 52 therewithin when the sliding cap 56 is in an open position.

Figure 6:
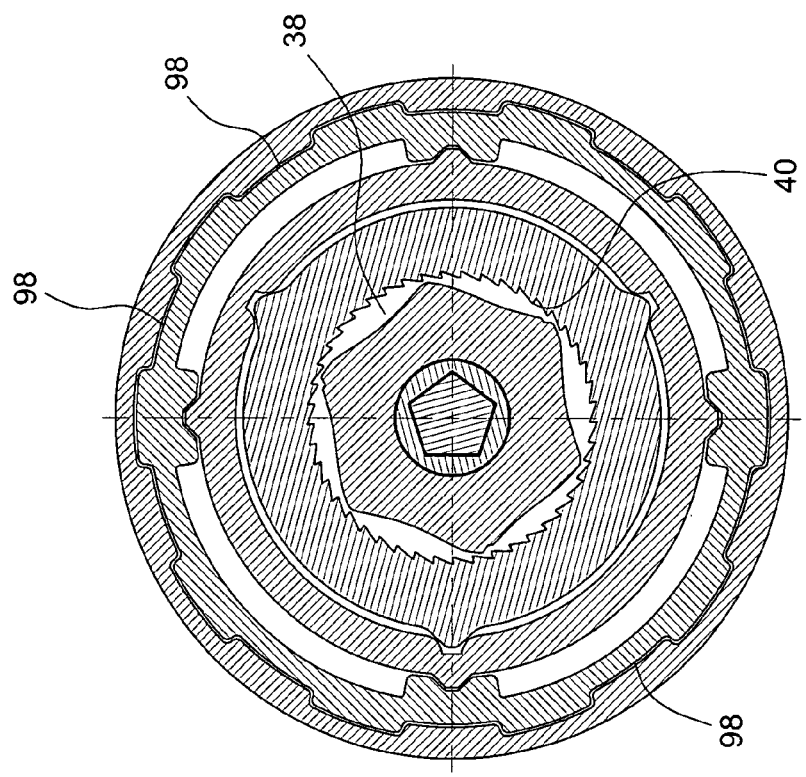
FIG. 6 is a cross-sectional view of the condiment mill taken along line 6-6 in of FIG. 5.

As best seen in FIG. 6, the sliding cap 56 comprises a third plurality of longitudinal protrusions 98 uniformly spaced apart from one another on the inner surface 86 of the wall portion 82 in a manner to correspondingly engage with the valleys 74, and the plurality of protrusions 70 on the first sleeve 52 mate with the spaces between the third plurality of the longitudinal protrusions 98 to lock the sliding cap 56 in a first open position wherein the condiments can be ground and dispensed as a result of rotating the sliding cap 56, which in turn rotates the first sleeve 52, and which in turn rotates the upper portion 26 of the grinding apparatus in order to grind the condiments.

As best seen in FIG. 8, the sliding cap 56 also includes a fourth plurality of longitudinal protrusions 100 uniformly spaced apart from one another on the inner surface 86 of the wall portion 82 and below the third plurality of longitudinal protrusions 98 in a manner to correspondingly engage with the corresponding spaces between the first plurality of protrusions 62 on the second sleeve 54 to lock the sliding cap 56 in a second closed position when the sliding cap 56 is slid upwardly, which, as will be explained in greater detail herein, will mate with the frusto-conically shaped cap 50 to create a seal and function as a lid to close off the dispensing opening of the condiment mill.

The frusto-conically shaped cap 50 includes an upright tab member 102 for a user's grip in order to rotate the cap, and a ridge-receiving peripheral edge 104 which will engage and mate with circular ridge 106 on the inner upper surface 86 of the sliding cap 56 in a snap-fit manner when the sliding cap 56 is in the second closed position to provide the sealing effect.

As stated hereinabove, by screwing the frusto-conically shaped cap 50 on top of the threaded post, the grinding wheel 44 is pushed downwardly thereby reducing the space between the teeth 46 and the grinding teeth 40 of the upper portion 26 in order to adjust the ground particles. The desired size of the ground particles is determined by aligning indicia 108 on the upper peripheral surface of the frusto-conically shaped cap 50 with the particle size indicia 110 on the upper periphery of the sliding cap 56.

While preferred embodiments of the invention have been shown and described, various modifications and substitutions may be made thereto without departing from the spirit and scope of the invention. Accordingly, it is to be understood that the present invention has been described by way of illustration only, and this description should not be construed as limiting to the several claims appended hereto.

What is claimed is:

1. A condiment mill, comprising:
   a first sleeve;
   a second sleeve rotatably attached to said first sleeve;
   a grinding apparatus operably disposed within said first and second sleeves;
   a sliding cap slidably mounted over said first and said second sleeves; wherein the sliding cap further comprises a first plurality of longitudinal protrusions and a second plurality of longitudinal protrusions on an inner surface thereof;
   a cap disposed on the grinding apparatus;
   wherein said sliding cap is slidable between a first position to rotate the grinding apparatus for grinding condiments and a second position secured against said cap to provide a seal for the condiment mill.

2. The condiment mill of claim 1, wherein the grinding apparatus further comprises an upper portion having a plurality of grinding teeth, a lower portion rotatable relative to the upper portion, and a grinding wheel having a plurality of teeth in facing relation to said grinding teeth of the upper portion.

3. The condiment mill of claim 2, wherein the first sleeve is slidably secured over the upper portion of the grinding apparatus and the second sleeve is slidably secured over the lower portion of the grinding apparatus.

4. The condiment mill of claim 1, wherein the first sleeve further comprises a third plurality of protrusions on an outer surface thereof, and the second sleeve further comprises a fourth plurality of protrusions on an outer surface thereof.

5. The condiment mill of claim 4, wherein the first plurality of longitudinal protrusions alternately engages the third plurality of protrusions when the sliding cap is in a first open position, and the second plurality of protrusions alternately engages the fourth plurality of protrusions when the sliding cap is in a second closed position.

6. The condiment mill of claim 4, wherein the sliding cap includes a circular ridge on an upper inner surface thereof, the cap includes a ridge-receiving peripheral edge for engaging said circular ridge when the sliding cap is in a second closed position.

7. The condiment mill of claim 6, wherein the second sleeve further comprises an inner threaded lower portion for threadably engaging a threaded upper mouth of a spice jar.

8. The condiment mill of claim 6, wherein the second sleeve further comprises a peripheral ring portion on an upper portion thereof having a smaller diameter than that of the second sleeve and for rotatably receiving the lower portion of the first sleeve.

9. In combination with a condiment jar having an outer wall, a threaded mouth bounding an opening at top for providing access inside the condiment jar, a condiment mill, comprising:
- a first sleeve;
- a second sleeve rotatably attached to said first sleeve;
- a grinding apparatus operably disposed within said first and second sleeves;
- a sliding cap slidably mounted over said first and said second sleeves; wherein the sliding cap further comprises a first plurality of longitudinal protrusions and a second plurality of longitudinal protrusions on an inner surface thereof;
- a cap disposed on the grinding apparatus;
- wherein said sliding cap is slidable between a first position to rotate the grinding apparatus for grinding condiments and a second position secured against said cap to provide a seal for the condiment mill.

10. The condiment jar and condiment mill combination of claim 9, wherein the grinding apparatus further comprises an upper portion having a plurality of grinding teeth, a lower portion rotatable relative to the upper portion, a grinding wheel having a plurality of teeth in facing relation to said grinding teeth of the upper portion.

11. The condiment jar and condiment mill combination of claim 10, wherein the first sleeve is slidably secured over the upper portion of the grinding apparatus and the second sleeve is slidably secured over the lower portion of the grinding apparatus.

* * * * *